(12) United States Patent
Yu et al.

(10) Patent No.: US 12,376,633 B2
(45) Date of Patent: Aug. 5, 2025

(54) GLOVE, HAND GESTURE RECOGNITION METHOD, DEVICE AND APPARATUS

(71) Applicant: GOERTEK INC., Shandong (CN)

(72) Inventors: Mingdan Yu, Shandong (CN); Xinliang Yu, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/552,451

(22) PCT Filed: Jun. 29, 2022

(86) PCT No.: PCT/CN2022/102370
§ 371 (c)(1),
(2) Date: Sep. 26, 2023

(87) PCT Pub. No.: WO2023/184758
PCT Pub. Date: Oct. 5, 2023

(65) Prior Publication Data
US 2025/0082052 A1    Mar. 13, 2025

(30) Foreign Application Priority Data
Mar. 30, 2022  (CN) .......................... 202210325302.0

(51) Int. Cl.
*A41D 19/00* (2006.01)
*G06F 3/01* (2006.01)

(52) U.S. Cl.
CPC ......... *A41D 19/0027* (2013.01); *G06F 3/014* (2013.01)

(58) Field of Classification Search
CPC ........................... A41D 19/0027; G06F 3/014
See application file for complete search history.

(56) References Cited

U.S. PATENT DOCUMENTS

| | | | |
|---|---|---|---|
| 2016/0132111 A1* | 5/2016 | Lowe | H03M 7/3082 345/156 |
| 2017/0086519 A1 | 3/2017 | Vigano' et al. | |
| 2017/0208565 A1* | 7/2017 | Lowe | G01S 5/0036 |
| 2020/0026351 A1* | 1/2020 | Lin | G06F 3/017 |

FOREIGN PATENT DOCUMENTS

| | | |
|---|---|---|
| CN | 107692376 A | 2/2018 |
| CN | 109156917 A | 1/2019 |
| CN | 109820266 A | 5/2019 |
| CN | 112595445 A | 4/2021 |
| CN | 215347222 U | 12/2021 |
| CN | 114661159 A | 6/2022 |

* cited by examiner

*Primary Examiner* — Phuong H Nguyen
(74) *Attorney, Agent, or Firm* — Shih IP Law Group, PLLC (57) ABSTRACT

The present disclosure discloses a glove and a hand gesture recognition method, device, and apparatus, which are applied to the technical field of intelligent wearable devices. The glove includes a fabric-based pressure sensor configured to collect sensor information corresponding to a pressure of respective glove knitting positions, wherein the glove knitting positions include finger joint positions; and a data processing and transmitting module connected to the fabric-based pressure sensor and configured to obtain pressure information corresponding to the sensor information and transmit the pressure information to the hand gesture recognition apparatus.

13 Claims, 5 Drawing Sheets

GLOVE, HAND GESTURE RECOGNITION METHOD, DEVICE AND APPARATUS

The present disclosure claims the priority to the Chinese Patent Application No. 202210325302.0, entitled "GLOVE, HAND GESTURE RECOGNITION METHOD, DEVICE AND APPARATUS", filed with China Patent Office on Mar. 30, 2022, the entire contents of which are incorporated into herein by reference.

TECHNICAL FIELD

The present disclosure relates to the technical field of intelligent wearable devices, and more particularly, to a glove and a hand gesture recognition method, device, and apparatus.

DESCRIPTION OF RELATED ART

With the widespread application of head-mounted display devices such as virtual reality (VR) devices and augmented reality (AR) devices, intelligent gloves have been widely used as a commonly used control accessory configured to the head-mounted display devices. The basic functions of intelligent gloves are to detect and recognize hand gestures (e.g., finger gestures and wrist gestures) of the user.

In the prior art, the recognition of hand gestures of the user is mainly realized by conventional pressure sensors or inertial sensors. Such method requires the pressure sensor or inertial sensor to be attached to a surface of the glove, and the sensor requires circuit connection through a flexible circuit board. As a result, the intelligent gloves have a larger size, heavier, and uncomfortable wearing. Therefore, it is a problem to be solved urgently to realize an intelligent glove which is convenient to perform hand gesture detection, having a miniaturized size and light weight, while improving the wearing comfort properties of intelligent gloves.

SUMMARY

An object of the present disclosure is to provide a glove and a hand gesture recognition method, device, and apparatus, which adopts a fabric-based pressure sensor, so that it may realize an intelligent glove which is convenient to perform hand gesture detection, having a miniaturized size and light weight, while improving the wearing comfort properties of intelligent gloves.

In order to achieve the above object, the present disclosure provides a glove including: a fabric-based pressure sensor configured to collect sensor information corresponding to a pressure of respective glove knitting positions, wherein the glove knitting positions include finger joint positions; and a data processing and transmitting module connected to the fabric-based pressure sensor and configured to obtain pressure information corresponding to the sensor information and transmit the pressure information to a hand gesture recognition apparatus.

Optionally, the fabric-based pressure sensor includes a first sensor disposed on a front side and/or a back side of the grove at positions corresponding to respective finger joint positions, wherein the finger joint positions include at least one of three joint positions corresponding to each of the little finger, ring finger, middle finger, and index finger of the glove and two joint positions of the glove corresponding to the thumb.

Optionally, the fabric-based pressure sensor further includes a second sensor disposed at positions of the glove corresponding to respective fingertips.

Optionally, the fabric-based pressure sensor further includes a third sensor disposed on a front side of the glove at a position corresponding to a palm.

Optionally, the fabric-based pressure sensor further includes a fourth sensor disposed at a position of the glove corresponding to a wrist.

Optionally, the data processing and transmitting module includes a wireless transmission component configured to wirelessly transmit the pressure information to the hand gesture recognition apparatus.

The present disclosure also provides a hand gesture recognition method, which is applied to the above-mentioned glove, including: obtaining pressure information sent by the glove; determining hand bending information according to the pressure information, wherein the hand bending information includes finger bending angle information; and identifying hand gesture of the user of the glove according to the hand bending information.

Optionally, determining hand bending information according to the pressure information includes: determining hand bending information according to the pressure information and a preset corresponding database, wherein the hand bending information further includes wrist bending angle information, and the preset corresponding database includes correspondence data between the pressure information of each fabric-based pressure sensor provided at respective glove knitting positions and the hand bending information and wrist bending angle information.

Optionally, the method further includes: before determining hand bending information according to the pressure information, determining whether the glove is in a wearing state according to the pressure information. If the glove is in a wearing state, performing the step of determining hand bending information according to the pressure information.

The present disclosure also provides a hand gesture recognition device, which is applied to the above-mentioned glove, including: a pressure obtaining unit configured to obtain pressure information sent by the glove; a bending determining unit configured to determine hand bending information according to the pressure information, wherein the hand bending information includes finger bending angle information; and a hand identification unit configured to identify hand gesture of the user of the glove according to the hand bending information.

The present disclosure also provides a hand gesture recognition apparatus, including: a memory configured to store a computer program; and a processor configured to implement steps of the above-mentioned hand gesture recognition method when executing the computer program.

The glove provided by the present disclosure includes a fabric-based pressure sensor configured to collect sensor information corresponding to pressures of respective glove knitting positions, wherein the glove knitting positions include finger joint positions; and a data processing and transmitting module connected to the fabric-based pressure sensor and configured to obtain pressure information corresponding to the sensor information and transmit the pressure information to the hand gesture recognition apparatus.

According to the present disclosure, by providing the fabric-based pressure sensor in the glove, when a user wears the glove, the fabric-based pressure sensor may collect sensor information of pressure at a corresponding position, and transmit the pressure information corresponding to the sensor information to the hand gesture recognition apparatus by using the data processing and transmitting module, so that the hand gesture recognition apparatus may complete accurate hand gesture detection by using the pressure information. In addition, due to the connection convenience of the fabric-based pressure sensor, a flexible circuit board may be omitted, so that an intelligent glove having miniaturized size and light weight may be realized, and the wearing comfort of the intelligent glove and user experience may be improved. In addition, the present disclosure also provides a hand gesture recognition method, device, and apparatus, which also have the above beneficial effects.

BRIEF DESCRIPTION OF DRAWINGS

In order to illustrate the embodiments of the present disclosure more clearly and the technical solution of the prior art, the drawings required to be used for the content of the embodiments or the prior art will be briefly described in the following. Obviously, the drawings in the following description are merely a part of the drawings of the present disclosure, and for those of ordinary skill in the art, other drawings may also be obtained from the provided drawings without any creative effort.

DETAILED DESCRIPTIONS

In order to make the objects, technical solutions, and advantages of the present disclosure clearer, technical solutions in the embodiments of the present disclosure will be clearly and completely described below in conjunction with the accompanying drawings in the embodiments. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

Figure 1:
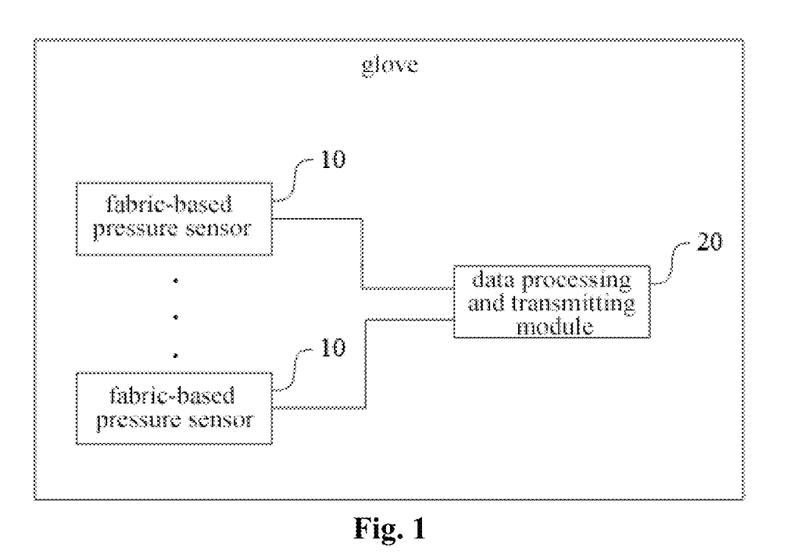
FIG. 1 is a block diagram of a glove according to an embodiment of the present disclosure.

Referring to FIG. 1, which is a block diagram of a glove according to an embodiment of the present disclosure, the glove may include: a fabric-based pressure sensor 10 configured to collect sensor information corresponding to the pressures of respective glove knitting positions, the glove knitting positions corresponding to a plurality of finger joint positions; and a data processing and transmitting module 20 connected to the fabric-based pressure sensor 10 and configured to obtain pressure information corresponding to the sensor information and transmit the pressure information to a hand gesture recognition apparatus.

It will be understood that, in the embodiment, by providing the fabric-based pressure sensor 10 at respective glove knitting positions in the glove, when a user wears the glove, the fabric-based pressure sensor 10 may collect sensor information of pressure at respective glove knitting positions, so that the data processing and transmitting module 20 may obtain corresponding pressure information by using the sensor information and transmit it to the hand gesture recognition apparatus, so that the hand gesture recognition apparatus may realize hand gesture detection by using the pressure information.

Figure 2:
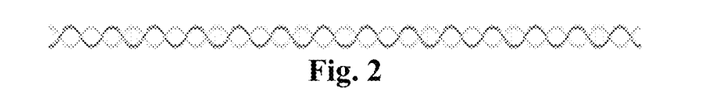
FIG. 2 is a schematic diagram of a pressure sensing yarn of a fabric-based pressure sensor according to an embodiment of the present disclosure.
Figure 3:
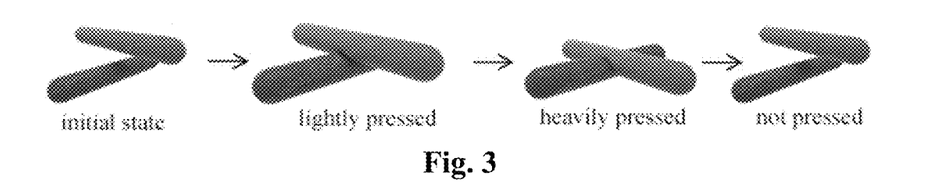
FIG. 3 is a schematic diagram of the principle of the fabric-based pressure sensor according to an embodiment of the present disclosure.

Specifically, the specific device type of the fabric-based pressure sensor 10 in the embodiment may be selected according to practical scenarios and user requirements. For example, in order to reduce configuration costs, the fabric-based pressure sensor 10 in the embodiment may use two or more pressure sensing yarns (i.e., positive yarn and negative yarn). That is, the pressure sensing yarn in the fabric-based pressure sensor 10 may include a positive yarn connected to a positive pole of a power supply (e.g., a constant current source) and a negative yarn connected to a negative pole of the power supply. For example, a fabric-based pressure sensor 10 includes two pressure sensing yarns, one may be used as the positive yarn, and the other may be used as the negative yarn. When a fabric-based pressure sensor 10 includes multiple pressure-sensing yarns, one group thereof may be used as the positive yarn and the other may be used as the negative yarn. The positive and negative yarns in each fabric-based pressure sensor 10 may be intertwined with each other as shown in FIG. 2 or interweaved with each other in other interweaving ways, so that when the user wears gloves, the pressure sensing yarn in the fabric-based pressure sensor 10 may be deformed by an external force brought by the deformation of the glove, and at the same time, the resistance between the pressure sensing yarns (i.e., positive yarn and negative yarn) in the fabric-based pressure sensor 10 may be changed. As shown in FIG. 3, when the fabric-based pressure sensor 10 includes a positive electrode yarn and a negative electrode yarn, the resistance between the two pressure sensing yarns may be changed due to external pressing force, and the greater the mutual pressing force, the greater the deformation, the smaller the resistance.

Figure 4:
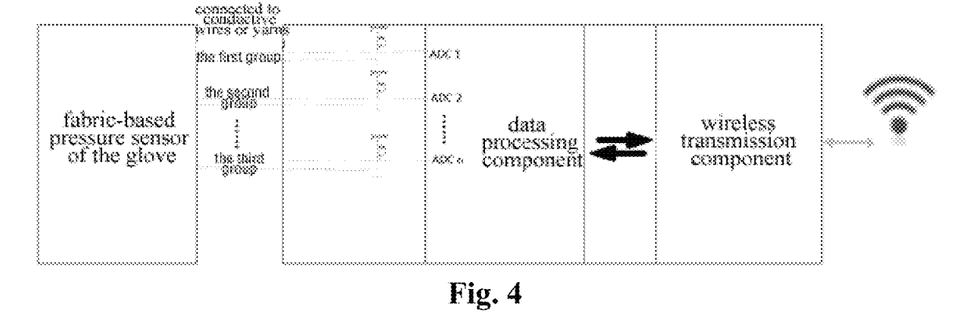
FIG. 4 is a schematic diagram of the circuit principle of the glove according to an embodiment of the present disclosure.

Accordingly, each fabric-based pressure sensor 10 may be connected to the data processing and transmitting module 20 through a conductive yarn or ordinary conductive wire, so that the data processing and transmitting module 20 may receive sensor information collected by the fabric-based pressure sensor 10. As shown in FIG. 4, the fabric-based pressure sensor 10 may be connected to a data processing part (e.g., single chip, microcontroller unit (MCU), ARM processor, embedded processor, digital signal process (DSP), field-programmable gate array (FPGA), or the like) of the data processing and transmitting module 20 through a conductive yarn or ordinary conductive wire. The data processing part in the data processing and transmitting module 20 may be used to collect sensor information of the fabric-based pressure sensor and perform preliminary processing. For example, the data processing part may dynamically detect the resistance of the fabric-based pressure sensor, and convert the resistance of the fabric-based pressure sensor 10 into a corresponding voltage signal (i.e., sensor information) through voltage division of a voltage dividing circuit (e.g., the voltage division of a voltage dividing resistor), and the data processing part may continuously collect the voltage signal of each fabric-based pressure sensor 10 on the wearing deformable component by using each ADC (analog-to-digital converter) port, and convert the voltage signal into corresponding voltage information (for example, resistance value).

It will be understood that, in the embodiment, the sensor information collected by the fabric-based pressure sensor 10 may be the sensor information corresponding to the external pressure on the fabric-based pressure sensor 10. The pressure information corresponding to the sensor information obtained by the data processing and transmitting module 20 may be the information corresponding to the sensor information and transmitted to the hand gesture recognition apparatus, so that the hand gesture recognition apparatus may confirm the external pressure on the fabric-based pressure sensor 10 by using the pressure information.

Specifically, in the embodiment, the specific content and data type of the sensor information and pressure information are not limited. For example, the sensor information may be the voltage signal transmitted by each fabric-based pressure sensor 10 to the ADC port connected to the data processing part of the data processing and transmitting module 20. The pressure information may be a resistance value converted by the data processing and transmitting module 20 using the voltage signal collected by the ADC port, the pressure information may also be a bending angle of the glove knitting position corresponding to this resistance value. For example, the data processing and transmitting module 20 may obtain the bending angle of corresponding glove knitting position through the resistance value converted from the voltage signal according to the correspondence between the resistance of the fabric-based pressure sensor 10 at respective glove knitting positions (e.g., finger joint or wrist) and the bending angle of the glove knitting position in the preset corresponding database, so that the bending angle data may be transmitted to the hand gesture recognition apparatus, and thus the hand gesture recognition apparatus may recognize the hand gesture of the user in the glove by using the bending angle data.

Accordingly, the glove knitting position in the embodiment may be a position where a fabric-based pressure sensor 10 is arranged in the glove. In the embodiment, the specific selection of the glove knitting position (i.e., the specific setting position and quantity of the fabric-based pressure sensor 10 in the glove) may be selected according to practical scenarios and user needs. For example, the glove knitting position may include a position corresponding to the finger joints in the glove (i.e., the finger joint position) when the user wears gloves, so that the bending angle of the finger joints of the user's hand may be determined using the sensor information collected by the fabric-based pressure sensor 10 at the finger joint position, to facilitate the recognition of hand gestures. For example, the finger joint positions may include at least one of three joint positions respectively corresponding to each of a little finger, a ring finger, a middle finger, and an index finger of the glove, and two joint positions corresponding to a thumb of the glove on the front side of the glove and/or the back side of the glove. That is, the fabric-based pressure sensor 10 includes a first sensor disposed at respective finger joint positions in the front side of the glove and/or the back side of the glove. Here, the finger joint positions include at least one of three joint positions respectively corresponding to each of a little finger, a ring finger, a middle finger, and an index finger of the glove and two joint positions of the glove corresponding to a thumb.

Figure 5:
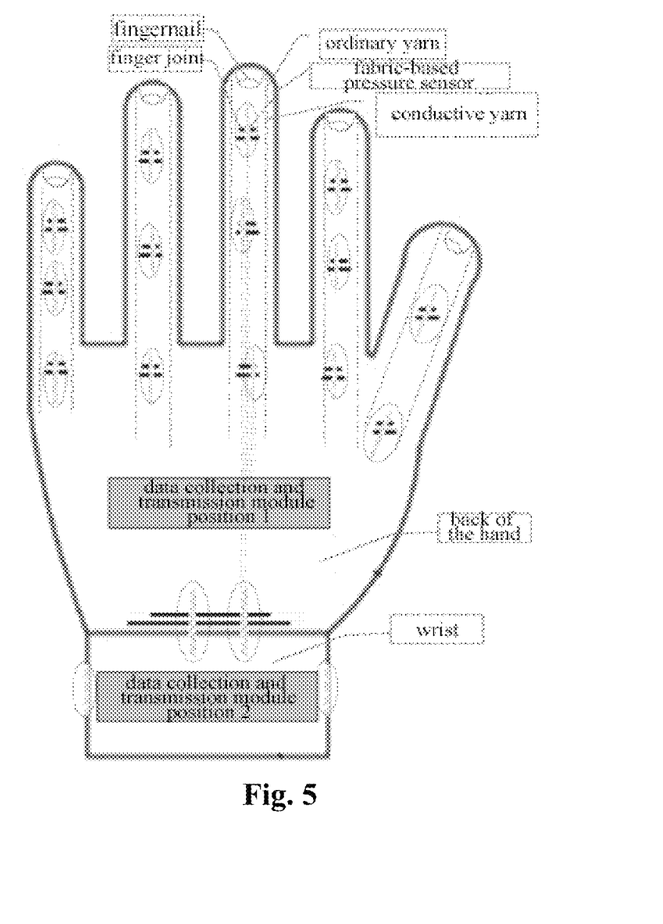
FIG. 5 is a schematic diagram of the back side of a left-handed glove according to an embodiment of the present disclosure.
Figure 6:
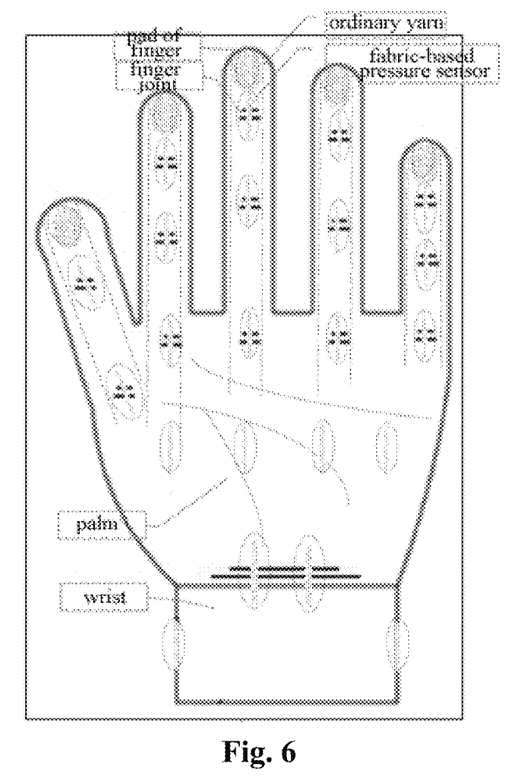
FIG. 6 is a schematic diagram of the front side of the left-handed glove according to an embodiment of the present disclosure.

Correspondingly, the glove knitting position may also include a position corresponding to any one or more fingertips (e.g., the fingertips in FIG. 5 and the pad of finger in FIG. 6) of the user in the glove (i.e., fingertip positions of the glove). As shown in FIGS. 5 and 6, the glove knitting position of each glove may include five fingertip positions of the glove, so that the pressures at the fingertip when the user wears gloves may be further detected by using the fabric-based pressure sensor 10 at the fingertip position of the glove. That is, the fabric-based pressure sensor 10 may further include a second sensor disposed at positions corresponding to respective fingertips of the glove. The glove knitting position may also include a palm position at the front side of the glove. As shown in FIG. 6, the glove knitting positions of each glove may include four palm positions, so that the bending angle of the palm when the user wears the glove may be detected by using the fabric-based pressure sensor 10 at the palm position, to ensure the accuracy of hand gesture recognition. That is, the fabric-based pressure sensor 10 may further include a third sensor disposed on a front side of the glove at a position corresponding to a palm.

Correspondingly, the glove knitting position may also include one or more positions at the user's wrist joint in the front side and/or back side of the glove (i.e., wrist positions of the glove). As shown in FIGS. 5 and 6, the glove knitting position of each glove may include two glove wrist positions on the front side of the glove, two glove wrist positions on the back side of the glove, and two glove wrist positions on both sides of the glove, a total of 6 glove wrist positions, so that the bending angle of the wrist when the user wears gloves may be detected by using the fabric-based pressure sensor 10 at the wrist position of the glove, so as to ensure the accuracy of hand gesture recognition.

It should be noted that, in the embodiment, the specific arrangement of the fabric-based pressure sensor 10 on the wearing deformable component may be selected. For example, the fabric-based pressure sensor 10 may be embedded in the glove knitting position of the glove. That is, the pressure sensing yarns in the fabric-based pressure sensor 10 (e.g., positive yarns and negative yarns) may be woven on the woven fabric embedded in an inner layer and/or a surface layer of the glove. the fabric-based pressure sensor 10 may also be woven at the glove knitting position of the glove. That is, the pressure sensing yarns in the fabric-based pressure sensor 10 may be directly woven in the glove knitting position of the glove.

Specifically, the data processing and transmitting module 20 in the embodiment may further include a data transmission component for transmitting the pressure information corresponding to each fabric-based pressure sensor 10 to the hand gesture recognition apparatus. The specific component type of the data transmission component may be selected according to practical scenarios and user needs. For example, the data transmission component may be specifically a wired transmission component for transmitting the pressure information to the hand gesture recognition apparatus through a communication cable connected to the hand gesture recognition apparatus. In order to facilitate the user's wearing and use, the data transmission component in the embodiment may also be specifically a wireless transmission component for wirelessly transmitting the pressure information to the hand gesture recognition apparatus. For example, the wireless transmission component may wirelessly transmit the pressure information to the hand gesture recognition apparatus by wireless transmission methods such as Bluetooth, Zigbee (a low-power LAN protocol), WIFI (Wireless-Fidelity, Wireless Broadband), etc.

Specifically, in the embodiment, the specific setting position of the data processing and transmitting module 20 in the glove may be selected according to practical scenarios and user needs. For example, the data processing and transmitting module 20 may be provided on the back side of the glove to reduce the impact of the process of the user wearing gloves on the data processing and transmitting module 20, and reduce the impact of the data processing and transmitting module 20 on the wearing comfort of the gloves. As shown in FIG. 5, the data processing and transmitting module 20 may be provided on the back side of the glove, on the back of the hand, such as a data collection and transmission module position 1, or provided on the back side of the glove, at a position corresponding to the arm, such as a data collection and transmission module position 2. However, the present disclosure is not limited thereto.

Likewise, in the embodiment, the specific implementation of the data processing and transmitting module 20 is not limited to the above. For example, the data processing and transmitting module 20 may be realized by a PCBA (Printed Circuit Board Assembly), or by a FPGA (Field-Programmable Gate Array).

According to the embodiment of the present disclosure, by providing the fabric-based pressure sensor 10 in the glove, when a user wears the glove, the fabric-based pressure sensor 10 may collect sensor information of pressure at a corresponding position, and transmit the pressure information corresponding to the sensor information to the hand gesture recognition apparatus by using the data processing and transmitting module 20, so that the hand gesture recognition apparatus may complete accurate hand gesture detection by using the pressure information. And, due to the connection convenience of the fabric-based pressure sensor 10, a flexible circuit board may be omitted, so that an intelligent glove having miniaturized size and light weight may be realized, and the wearing comfort of the intelligent glove and user experience may be improved.

On another aspect, embodiments of the present disclosure also provide a hand gesture recognition method using the glove as disclosed above. The hand gesture recognition method described below and the glove described above may correspond to each other.

Figure 7:
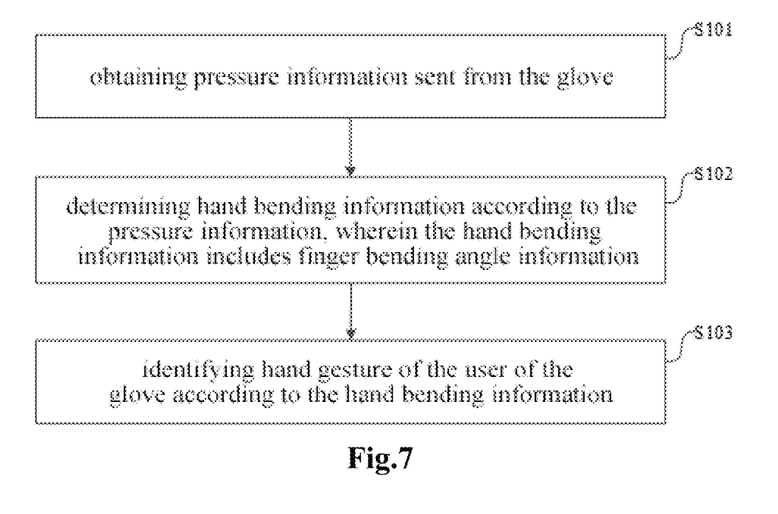
FIG. 7 is a flow chart of a hand gesture recognition method according to an embodiment of the present disclosure.

Referring to FIG. 7, which is a flow chart of a hand gesture recognition method according to an embodiment of the present disclosure, the method is applied to the gloves provided in the above-mentioned embodiments, and may include: Step 101: obtaining pressure information sent by the glove.

It will be understood that the hand gesture recognition method provided in the embodiment may be applied to the gloves provided in the above embodiments. That is, a processor in the hand gesture recognition apparatus (e.g., a computer, a mobile phone, a server, etc.) communicated with the gloves may implement the hand gesture recognition method provided in the embodiment to realize the recognition and detection of the hand gesture of the user wearing the glove.

Here, the pressure information in this step may be information corresponding to the pressures at the glove knitting positions obtained by the fabric-based pressure sensor sent by the data processing and transmitting module in the glove. The specific content of the pressure information in this step may be selected according to practical scenarios and user needs. For example, in order to reduce the calculation amount of the data processing and transmitting module, the pressure information may be the resistance value of the fabric-based pressure sensor corresponding to the pressures at the glove knitting positions. Alternatively, the pressure information may be the bending angle information corresponding to the pressures at the glove knitting positions. However, the pressure information is not limited to the above.

Accordingly, in this step, the processor may also obtain glove knitting position identification information (e.g., sensor identification) corresponding to each pressure information, so that the processor may determine the hand position of the user corresponding to each pressure information according to the glove knitting position identification information.

Step 102: determining hand bending information according to the pressure information. Here, the hand bending information includes finger bending angle information.

It should be noted that the hand bending information in this step may be the bending angle information at the installation position of each fabric-based pressure sensor in the glove (i.e., the glove knitting position). The specific quantity and content of the hand bending information in the embodiment may be selected. For example, when the glove knitting position includes the finger joint position, the hand bending information may include finger bending angle information; when the glove knitting position includes a palm position at the front side of the glove, the hand bending information may include palm bending angle information; when the glove knitting position includes the glove wrist position, the hand bending information may include wrist bending angle information; and when the glove knitting position includes the fingertip position of the glove, the hand bending information may include fingertip pressure information.

Specifically, the specific method for the processor to determine the hand bending information based on the pressure information in this step may be selected. For example, when the pressure information includes the resistance value of the fabric-based pressure sensor at respective glove knitting positions, the processor may obtain the hand bending angle information of corresponding glove knitting position by obtaining the resistance value of each fabric-based pressure sensor, according to the corresponding relationship between the resistance of the fabric-based pressure sensor at respective glove knitting positions and the bending angle of the glove knitting position in the preset corresponding database (i.e., the preset corresponding database). That is, in this step, the processor may determine the hand bending information according to the pressure information and the preset corresponding database. Here, the hand bending information includes wrist bending angle information, and the preset corresponding database includes corresponding relationship data between the pressure information of each fabric-based pressure sensors at respective glove knitting positions of the glove, and the hand bending information and the wrist bending angle information. When the pressure information includes bending angle information at respective glove knitting positions, the processor in this step may directly determine the bending angle information at the glove knitting position as the corresponding hand bending information. However, the embodiment is not limited thereto.

Furthermore, before the above step, the processor may detect the wearing condition of the glove by using the obtained pressure information, to realize the wearing detection of the glove. That is, before this step, the processor may determine whether the glove is in a wearing state according to the pressure information. If the glove is in a wearing state, perform step 102. If the glove is not in a wearing state, the process ends or return to step 101 to continue obtaining pressure information, to avoid a hand gesture recognition process when the user is not wearing gloves and reduce the power consumption of the hand gesture recognition apparatus.

Step 103: identifying hand gesture of the user of the glove according to the hand bending information.

It will be understood that, in this step, the processor may detect and identify the hand gesture of the user according to the determined bending degree (i.e., hand bending information) at each position of the hand (e.g., finger joints and wrist) of the user of the glove, to realize the recognition of the hand gesture of the glove's user.

Figure 8:
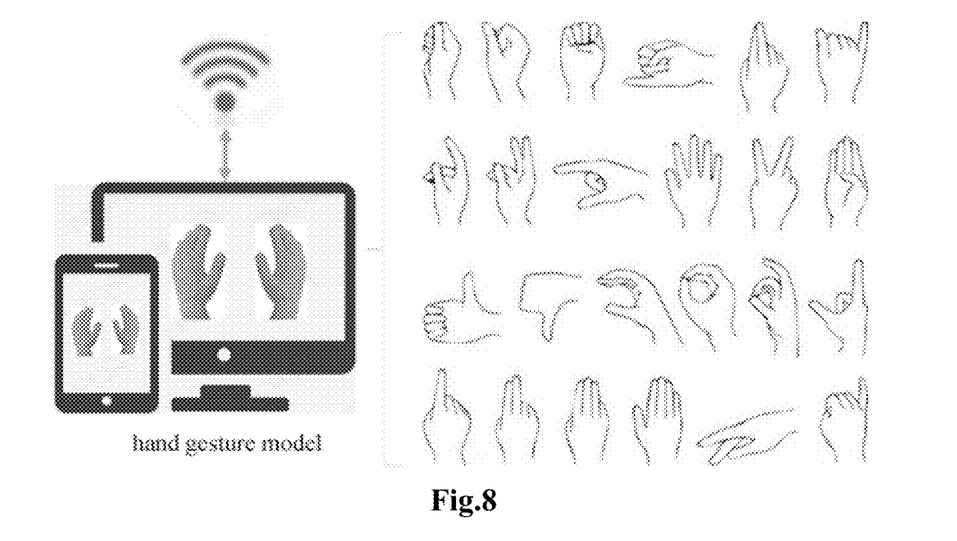
FIG. 8 is a schematic diagram showing the establishment a finger gestures model of the hand gesture recognition method according to an embodiment of the present disclosure.

Specifically, the specific method for the processor to identify the hand gesture of the user of the glove (i.e., the hand gesture) based on the hand bending information may be selected according to practical scenarios and user needs. For example, the processor may identify the hand gesture of the user of the glove by using a pre-established hand gesture model (e.g., finger and wrist gesture model) corresponding to each hand gesture (e.g., finger and wrist gestures) and the bending angle at respective glove knitting positions. That is, in this step, the processor may detect the hand gesture of the user according to the hand bending information and the hand gesture model. As shown in FIG. 8, the processor may identify the hand gesture of the user according to finger bending angle information in the obtained hand bending information by using the pre-established hand gesture model, so that the identified finger gesture may be embedded into some applications (e.g., game applications, office applications) as an interactive method. Correspondingly, the method provided in the embodiment may further include a step of executing a preset operation corresponding to the identified finger gesture.

Correspondingly, the method provided in the embodiment may further include a process of establishing a hand gesture model. For example, the processor may establish a hand gesture model according to the preset hand bending information corresponding to each hand gesture. For example, in the process of establishing a hand gesture model, the user of the glove may make a corresponding gesture according to the hand gesture displayed by the hand gesture recognition apparatus, so that the processor may use the hand bending information obtained at this time as preset hand bending information corresponding to the hand gesture, to use the preset hand bending information corresponding to each hand gesture to establish a hand gesture model.

According to the embodiment of the present disclosure, by providing the fabric-based pressure sensor in the glove, when a user wears the glove, the fabric-based pressure sensor may collect sensor information of pressure at a corresponding position, and transmit the pressure information corresponding to the sensor information to the hand gesture recognition apparatus by using the data processing and transmitting module, so that the hand gesture of the user of the glove may be identified according to the hand bending information corresponding to the pressure information, so as to realize accurate hand gesture detection. In addition, due to the connection convenience of the fabric-based pressure sensor, a flexible circuit board may be omitted, so that an intelligent glove having miniaturized size and light weight may be realized, and the wearing comfort of the intelligent glove and user experience may be improved.

Corresponding to the above method embodiment, an embodiment of the present disclosure also provides a hand gesture recognition device. The hand gesture recognition device described below and the hand gesture recognition method described above may correspond to each other.

Figure 9:
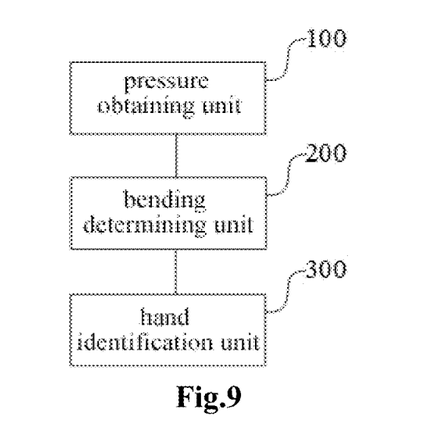
FIG. 9 is a block diagram of a hand gesture recognition device according to an embodiment of the present disclosure.

Referring to FIG. 9, which is a block diagram of a hand gesture recognition device according to an embodiment of the present disclosure, the device is applied to the gloves provided in the above-mentioned embodiments, and may include: a pressure obtaining unit 100 configured to obtain pressure information sent by the glove; a bending determining unit 200 configured to determine hand bending information according to the pressure information, the hand bending information includes finger bending angle information; and a hand identification unit 300 configured to identify hand gesture of the user of the glove according to the hand bending information.

In some embodiments, the pressure obtaining unit 100 may be specifically configured to determine hand bending information according to the pressure information and a preset corresponding database. Here, the hand bending information includes wrist bending angle information, and the preset corresponding database includes corresponding relationship data between the pressure information of each fabric-based pressure sensors at respective glove knitting positions of the glove, and the hand bending information and the wrist bending angle information.

In some embodiments, the device further includes a wearing detection module configured to determine whether the glove is in a wearing state according to the pressure information. If the glove is in a wearing state, send an activation signal to the bending determining unit 200.

According to the embodiment of the present disclosure, by providing the fabric-based pressure sensor in the glove, when a user wears the glove, the fabric-based pressure sensor may collect sensor information of pressure at a corresponding position, and transmit the pressure information corresponding to the sensor information to the hand gesture recognition apparatus by using the data processing and transmitting module, so that the hand gesture of the user of the glove may be identified according to the hand bending information corresponding to the pressure information through the hand identification unit 300 so as to realize accurate hand gesture detection. In addition, due to the connection convenience of the fabric-based pressure sensor, a flexible circuit board may be omitted, so that an intelligent glove having miniaturized size and light weight may be realized, and the wearing comfort of the intelligent glove and user experience may be improved.

On another aspect, embodiments of the present disclosure also provide a hand gesture recognition apparatus. The hand gesture recognition apparatus described below and the hand gesture recognition method described above may correspond to each other.

Figure 10:
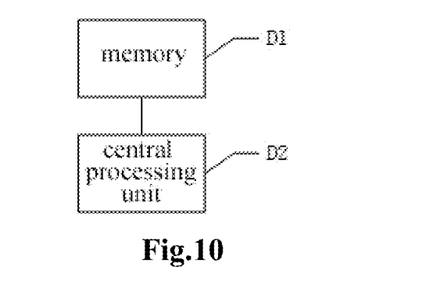
FIG. 10 is a structural schematic diagram of a hand gesture recognition apparatus according to an embodiment of the present disclosure.

Referring to FIG. 10, which is a structural schematic diagram of a hand gesture recognition apparatus according to an embodiment of the present disclosure, the apparatus may include: a memory D1 for storing a computer program;

and a processor D2 configured to implement steps of the above-mentioned hand gesture recognition method when executing the computer program.

Figure 11:
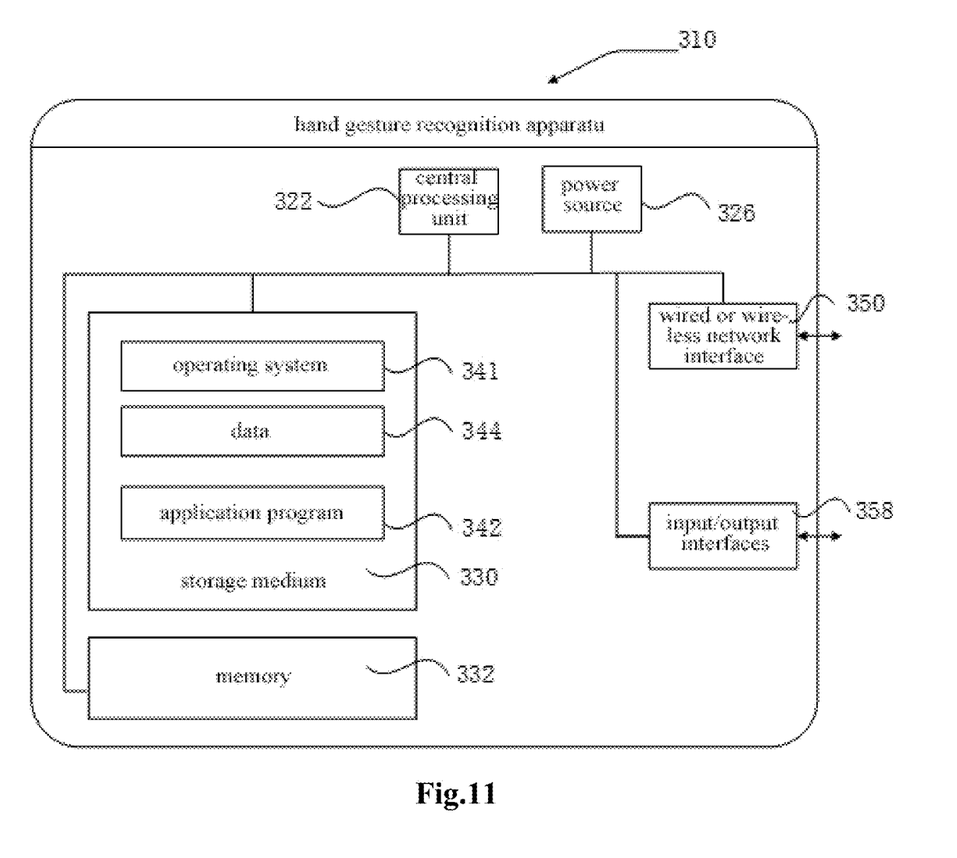
FIG. 11 is a schematic diagram showing a specific structure of the hand gesture recognition apparatus according to an embodiment of the present disclosure.

Specifically, the hand gesture recognition apparatus in the embodiment may specifically be a terminal device such as a mobile phone, a head-mounted display device, a computer, or may specifically be a server. The specific structure of the hand gesture recognition apparatus may refer to FIG. 11. FIG. 11 is a schematic diagram showing a specific structure of the hand gesture recognition apparatus according to an embodiment of the present disclosure. A hand gesture recognition apparatus 310, which exhibits significant differences due to differences in configuration or performance, may include one or more central processing units (CPU) 322 (for example, one or more processors) and a memory 332, and one or more storage media 330 for storing application programs 342 or data 344 (for example, one or more mass storage devices). Here, the memory 332 and the storage medium 330 may be temporary storage or persistent storage. A program stored in the storage medium 330 may include one or more units. Furthermore, the central processing unit 322 may be configured to communicate with the storage medium 330, and execute a series of instruction operations in the storage medium 330 on the hand gesture recognition apparatus 310.

The hand gesture recognition apparatus 310 may further include one or more power sources 326, one or more wired or wireless network interfaces 350, one or more input/output interfaces 358, and/or, one or more operating systems 341, for example, Windows Server™, Mac OS X™, Unix™, Linux™, Free BSD™, etc.

The steps in the hand gesture recognition method described above may be realized by the structure of the hand gesture recognition apparatus.

The various embodiments in the present specification are described in a progressive manner, and each embodiment focuses on the differences from other embodiments, and the same and similar parts between the various embodiments may be referred to each other. As for the device and apparatus disclosed in the embodiments, since they correspond to the method disclosed in the embodiment, the description is relatively simple. For relevant parts, please refer to the description of the method.

The above provides a detailed introduction to a glove and a hand gesture recognition method, device and apparatus provided by the present disclosure. The principles and embodiments of the present disclosure are described by specific examples, and the explanations of the above embodiments are only used to help understand the methods and technical concepts of the disclosure. It should be noted that for those skilled in the art, several improvements and modifications may be made to the present disclosure without departing from the principles of the disclosure, and these improvements and modifications also fall within the protection scope of the claims of the present disclosure.

What is claimed is:

1. A glove, comprising:
    a fabric-based pressure sensor configured to collect sensor information corresponding to pressures of respective glove knitting positions, wherein the glove knitting positions comprise finger joint positions; and
    a data processing and transmitting module connected to the fabric-based pressure sensor and configured to obtain pressure information corresponding to the sensor information and transmit the pressure information to a hand gesture recognition apparatus,
    wherein the fabric-based pressure sensor comprises a positive yarn connected to a positive terminal of a power supply and a negative yarn connected to a negative terminal of the power supply,
    wherein the power supply is a constant current source, and
    wherein resistance between the positive yarn and the negative yarn changes in response to deformation of the fabric-based pressure sensor.

2. The glove of claim 1, wherein the fabric-based pressure sensor comprises a first sensor disposed on a front side and/or a back side of the grove at positions corresponding to respective finger joint positions, and
    wherein the finger joint positions comprise at least one of three joint positions respectively corresponding to each of a little finger, a ring finger, a middle finger, and an index finger of the glove and two joint positions of the glove corresponding to a thumb.

3. The glove of claim 1, wherein the fabric-based pressure sensor further comprises a second sensor disposed at positions of the glove corresponding to respective fingertips.

4. The glove of claim 1, wherein the fabric-based pressure sensor further comprises a third sensor disposed on a front side of the glove at a position corresponding to a palm.

5. The glove of claim 1, wherein the fabric-based pressure sensor further comprises a fourth sensor disposed at a position of the glove corresponding to a wrist.

6. The glove of claim 1, wherein the data processing and transmitting module comprises a wireless transmission component configured to wirelessly transmit the pressure information to the hand gesture recognition apparatus.

7. A hand gesture recognition method, which is applied to the glove of claim 1, comprising:
    obtaining pressure information sent by the glove;
    determining hand bending information according to the pressure information, wherein the hand bending information comprises finger bending angle information; and
    identifying hand gesture of a user of the glove according to the hand bending information.

8. The hand gesture recognition method of claim 7, wherein determining hand bending information according to the pressure information comprises:
    determining hand bending information according to the pressure information and a preset corresponding database, wherein the hand bending information further comprises wrist bending angle information, and the preset corresponding database comprises correspondence data between pressure information of each fabric-based pressure sensor provided at respective glove knitting positions of the glove, and the hand bending information, the wrist bending angle information.

9. The hand gesture recognition method of claim 7, further comprising: before determining hand bending information according to the pressure information,
    determining whether the glove is in a wearing state according to the pressure information;
    if the glove is in a wearing state, determining the hand bending information according to the pressure information.

10. A hand gesture recognition device, which is applied to the glove of claim 1, comprising:
    a pressure obtaining unit configured to obtain pressure information sent by the glove;
    a bending determining unit configured to determine hand bending information according to the pressure information, wherein the hand bending information comprises finger bending angle information; and a hand identification unit configured to identify hand gesture of a user of the glove according to the hand bending information.

11. A hand gesture recognition apparatus, comprising:
a memory configured to store a computer program; and
a processor configured to implement steps of the hand gesture recognition method of claim 7 when executing the computer program.

12. The glove of claim 1, wherein the positive yarn and the negative yarn are woven on the woven fabric embedded in an inner layer and/or on a surface layer of the glove.

13. The glove of claim 1, wherein the positive yarn and the negative yarn are directly woven at the glove knitting position of the glove.

\* \* \* \* \*